United States Patent
He et al.

(10) Patent No.: US 10,203,744 B2
(45) Date of Patent: Feb. 12, 2019

(54) DISPLAY APPARATUS AND METHOD FOR CONTROLLING POWER USAGE OF THE DISPLAY APPARATUS

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Quanhua He, Beijing (CN); Hao Zhang, Beijing (CN); Lingyun Shi, Beijing (CN); Guangquan Wang, Beijing (CN); Zhen Chen, Beijing (CN); Jian Bo, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/325,436

(22) PCT Filed: May 20, 2016

(86) PCT No.: PCT/CN2016/082882
§ 371 (c)(1),
(2) Date: Jan. 10, 2017

(87) PCT Pub. No.: WO2017/012407
PCT Pub. Date: Jan. 26, 2017

(65) Prior Publication Data
US 2017/0205872 A1     Jul. 20, 2017

(30) Foreign Application Priority Data
Jul. 20, 2015  (CN) .......................... 2015 1 0428203

(51) Int. Cl.
*G06F 1/32* (2006.01)
*G09G 3/34* (2006.01)
(Continued)

(52) U.S. Cl.
CPC .......... *G06F 1/3265* (2013.01); *G06F 1/1684* (2013.01); *G06F 1/1694* (2013.01);
(Continued)

(58) Field of Classification Search
CPC ...... G06F 3/0346; G06F 3/038; G06F 3/0416; G06F 1/3206; G06F 1/3265;
(Continued)

(56) References Cited

U.S. PATENT DOCUMENTS 6,529,144 B1 * 3/2003 Nilsen ................... G06F 1/1613
340/568.1
8,698,764 B1 * 4/2014 Karakotsios .......... G06F 1/1692
345/173
(Continued)

FOREIGN PATENT DOCUMENTS

CN     103049118 A     4/2013
CN     103248749 A     8/2013
(Continued)

OTHER PUBLICATIONS

International Search Report & Written Opinion dated Aug. 25, 2016 regarding PCT/CN2016/082882.
(Continued)

*Primary Examiner* — Dismery Mercedes
(74) *Attorney, Agent, or Firm* — Intellectual Valley Law, P.C.

(57) ABSTRACT

The present application discloses a display apparatus including a display panel; a backlight module; a motion sensor for detecting a motion parameter of the display apparatus and generating a motion parameter signal representing the
(Continued)

motion parameter; at least one signal processor for comparing the motion parameter with a threshold value, and generating a power off signal if the motion parameter is greater than the threshold value; and a controller for controlling a state of the backlight module; the controller is configured to control the backlight module in a power off state upon receiving the power off signal.

19 Claims, 7 Drawing Sheets

(51) Int. Cl.
    *G06F 3/041*           (2006.01)
    *G06F 1/16*            (2006.01)

(52) U.S. Cl.
    CPC .......... *G06F 1/3206* (2013.01); *G06F 1/3215* (2013.01); *G06F 1/3231* (2013.01); *G06F 3/0412* (2013.01); *G09G 3/3406* (2013.01); G09G 2320/0626 (2013.01); G09G 2330/022 (2013.01); Y02D 10/153 (2018.01); Y02D 10/173 (2018.01); Y02D 50/20 (2018.01)

(58) Field of Classification Search
    CPC .... G06F 1/3287; G06F 1/3246; G06F 1/3203; G06F 1/3262; G06F 3/0418; G06F 3/041; G06F 3/0412; G06F 2200/1636; G06F 2200/1637; G06F 1/1656; G06F 1/1626; G06F 1/3231; G06F 2203/04104; G09G 3/3406; G09G 2320/0626; G09G 2330/021; G09G 2330/02; G09G 5/006; G09G 2354/00; G06K 9/00375; Y02D 10/173

See application file for complete search history.

(56) References Cited

U.S. PATENT DOCUMENTS

| | | | | |
|---|---|---|---|---|
| 9,483,146 | B2* | 11/2016 | Davidson | G06F 3/044 |
| 9,626,029 | B2* | 4/2017 | Park | G06F 3/0414 |
| 9,632,642 | B2* | 4/2017 | Tokutake | G06F 3/0488 |
| 9,658,767 | B2* | 5/2017 | Ogita | G06F 1/1626 |
| 9,976,841 | B2* | 5/2018 | McCarthy | H04M 1/00 |
| 2006/0081771 | A1* | 4/2006 | Eliad Wardimon | G01J 1/32 250/221 |
| 2008/0238857 | A1* | 10/2008 | Zhang | G09G 3/3406 345/102 |
| 2008/0267521 | A1* | 10/2008 | Gao | G06K 9/228 382/254 |
| 2010/0134423 | A1* | 6/2010 | Brisebois | G06F 3/03547 345/173 |
| 2011/0080349 | A1* | 4/2011 | Holbein | G06F 1/3203 345/173 |
| 2011/0230228 | A1 | 9/2011 | Young | |
| 2012/0218177 | A1* | 8/2012 | Pang | G06F 3/0346 345/156 |
| 2013/0271413 | A1* | 10/2013 | Shibuya | G06F 3/044 345/173 |
| 2014/0078086 | A1* | 3/2014 | Bledsoe | G06F 3/041 345/173 |
| 2014/0320420 | A1* | 10/2014 | Ida | G06F 3/044 345/173 |
| 2014/0340338 | A1* | 11/2014 | Kim | G06F 3/0488 345/173 |
| 2015/0153861 | A1* | 6/2015 | Yamazaki | G06F 3/0488 345/173 |
| 2015/0277539 | A1* | 10/2015 | Chueh | G06F 1/3262 345/178 |
| 2016/0029219 | A1* | 1/2016 | Wu | H04W 12/08 455/411 |
| 2016/0062515 | A1* | 3/2016 | Bae | G06F 3/0414 345/174 |

FOREIGN PATENT DOCUMENTS

| | | |
|---|---|---|
| CN | 103353826 A | 10/2013 |
| CN | 103379222 A | 10/2013 |
| CN | 103853308 A | 6/2014 |
| CN | 103917943 A | 7/2014 |
| CN | 103970350 A | 8/2014 |
| CN | 104076904 A | 10/2014 |
| CN | 104380227 A | 2/2015 |
| CN | 104635918 A | 5/2015 |

OTHER PUBLICATIONS

The First Office Action in the Chinese Patent Application No. 201510428203.5, dated Jun. 1, 2017; English translation attached.
The Second Office Action in the Chinese Patent Application No. 201510428203.5, dated Feb. 12, 2018; English translation attached.

* cited by examiner

DISPLAY APPARATUS AND METHOD FOR CONTROLLING POWER USAGE OF THE DISPLAY APPARATUS

CROSS-REFERENCE TO RELATED APPLICATION

This application is a national stage application under 35 U.S.C. § 371 of International Application No. PCT/CN2016/082882, filed May 20, 2016, which claims priority to Chinese Patent Application No. 201510428203.5, filed Jul. 20, 2015, the contents of which are incorporated by reference in the entirety.

TECHNICAL FIELD

The present invention relates to display technology, more particularly, to a display apparatus and a method for controlling power usage of the display apparatus.

BACKGROUND

Display apparatuses such as mobile phones, tablet computers, and other portable devices have been widely used in people's daily life. In recent years, a significant amount of research efforts has been made to increase the operational time of the display apparatus, e.g., by prolonging the viability of the battery. In a conventional portable display apparatus such as a mobile phone, the backlight is automatically turned off when no user operation is detected after a period of time, even if the user is still viewing a display on the portable display apparatus. This design is not user-friendly.

SUMMARY

In one aspect, the present disclosure provides a display apparatus comprising a display panel; a backlight module; a motion sensor for detecting a motion parameter of the display apparatus and generating a motion parameter signal representing the motion parameter; at least one signal processor for comparing the motion parameter with a threshold value, and generating a power off signal if the motion parameter is greater than the threshold value; and a controller for controlling a state of the backlight module; the controller is configured to control the backlight module in a power off state upon receiving the power off signal.

Optionally, the motion parameter comprises a vibration frequency and an acceleration.

Optionally, the display apparatus further comprises an application processor for transmitting analog voltage to the display panel; wherein the controller is configured to control the application processor in a state in which transmission of analog voltage to the display panel is discontinued upon receiving the power off signal.

Optionally, the controller is configured to transmit a first analog voltage control signal to the application processor upon receiving the power off signal, the application processor is configured to be in the state in which transmission of analog voltage to the display panel is discontinued upon receiving the first analog voltage control signal.

Optionally, the controller is configured to maintain the state of the backlight module if the motion parameter is no greater than the threshold value and the display apparatus is in a sleep mode.

Optionally, the display apparatus further comprises an application processor for sending analog voltage to the display panel; wherein the controller is configured to maintain an analog voltage transmission state of the application processor if the motion parameter is no greater than the threshold value.

Optionally, the controller is configured to transmit a second analog voltage control signal to the application processor if the motion parameter is no greater than threshold value, the application processor is configured to maintain the analog voltage transmission state upon receiving the second analog voltage control signal.

Optionally, if the motion parameter is no greater than the threshold value; and the backlight module is in a power off state, the display apparatus is in an active mode when the motion parameter is determined to be no greater than the threshold value; the at least one signal processor generates a power on signal, and the controller is configured to control the backlight module in a power on state upon receiving the power on signal.

Optionally, the display apparatus further comprises an application processor for sending analog voltage to the display panel; wherein the controller is configured to transmit a third analog voltage control signal to the application processor if the motion parameter is no greater than threshold value, the application processor is configured to be in the state in which transmission of analog voltage to the display panel is resumed upon receiving the third analog voltage control signal.

Optionally, the display apparatus is a mobile phone comprising a front cover, a back cover, two long sides parallel to each other connecting the front cover and the back cover, and a contact sensor on the back cover of the mobile phone for detecting a contact from a conductive object abutting against the back cover, and generating a signal representing a gross contact area between the conductive object and the back cover; and the at least one signal processor is configured to compare the gross contact area with a threshold contact area; and generate the power off signal if the motion parameter is greater than the threshold value and the gross contact area is greater than the threshold contact area.

Optionally, the display apparatus is a mobile phone comprising a front cover, a back cover, two long sides parallel to each other connecting the front cover and the back cover, and one or more pressure sensor on the two long sides of the mobile phone for detecting a pressure from fingers pressed against the two long sides, and generating a signal representing a value of the pressure; and the at least one signal processor is configured to compare the value of the pressure with a threshold pressure value; and generate the power off signal if the motion parameter is greater than the threshold value and the value of the pressure is no greater than the threshold pressure value.

Optionally, the display apparatus is a mobile phone comprising a front cover, a back cover, two long sides parallel to each other connecting the front cover and the back cover, a contact sensor on the back cover of the mobile phone for detecting a contact from a conductive object abutting against the back cover, and generating a signal representing a gross contact area between the conductive object and the back cover; one or more pressure sensor on the two long sides of the mobile phone for detecting a pressure from fingers pressed against the two long sides, and generating a signal representing a value of the pressure; and the at least one signal processor is configured to compare the gross contact area with a threshold contact area and compare the value of the pressure with a threshold pressure value; and generate the power off signal if the motion parameter is greater than the threshold value, the gross contact area is greater than the threshold contact area, and the value of the pressure is no greater than the threshold pressure value.

In another aspect, the present disclosure provides a mobile phone comprising a display panel, a backlight module, a front cover, a back cover, two long sides parallel to each other connecting the front cover and the back cover; a contact sensor on the back cover of the mobile phone for detecting a contact from a conductive object abutting against the back cover, and generating a signal representing a gross contact area between the conductive object and the back cover; at least one signal processor for comparing the gross contact area with a threshold contact area; and generating a power off signal if the gross contact area is greater than the threshold contact area; and a controller for controlling a state of the backlight module; the controller is configured to control the backlight module in a power off state upon receiving the power off signal.

Optionally, the mobile phone further comprises a motion sensor for detecting a motion parameter of the display apparatus and generating a motion parameter signal representing a motion parameter; the motion parameter comprises a vibration frequency and an acceleration; the at least one signal processor is configured to compare the motion parameter with a threshold value; and generate the power off signal if the motion parameter is greater than the threshold value and the gross contact area is greater than the threshold contact area.

Optionally, the mobile phone further comprises one or more pressure sensor on the two long sides of the mobile phone for detecting a pressure from fingers pressed against the two long sides, and generating a signal representing a value of the pressure; the at least one signal processor is configured to compare the value of the pressure with a threshold pressure value; and generate the power off signal if the gross contact area is greater than the threshold contact area, and the value of the pressure is no greater than the threshold pressure value.

In another aspect, the present disclosure provides a method for controlling power usage of a display apparatus, the method comprising detecting a motion parameter of the display apparatus; generating a motion parameter signal representing a motion parameter; comparing the motion parameter with a threshold value; and generating a power off signal if the motion parameter is greater than the threshold value; and controlling a state of a backlight module of the display apparatus based on an outcome of the comparing step; wherein the controlling step comprises controlling the backlight module in a power off state when the power off signal is generated.

Optionally, the motion parameter comprises a vibration frequency and an acceleration.

Optionally, the controlling step comprises controlling an application processor of the display apparatus in a state in which transmission of analog voltage from the application processor to a display panel of the display apparatus is discontinued when the power off signal is generated.

Optionally, the controlling step comprises transmitting a first analog voltage control signal to the application processor when the power off signal is generated, causing the application processor to be in the state in which transmission of analog voltage from the application processor to the display panel is discontinued upon receiving the first analog voltage control signal.

Optionally, the controlling step comprises maintaining the state of the backlight module if the motion parameter is no greater than the threshold value and the display apparatus is in a sleep mode.

Optionally, the controlling step comprises maintaining an analog voltage transmission state of an application processor of the display apparatus if the motion parameter is no greater than the threshold value.

Optionally, the controlling step comprises transmitting a second analog voltage control signal to the application processor if the motion parameter is no greater than threshold value, causing the application processor to maintain the analog voltage transmission state upon receiving the second analog voltage control signal.

Optionally, if the motion parameter is no greater than the threshold value; and the backlight module is in a power off state, the display apparatus is in an active mode when the motion parameter is determined to be no greater than the threshold value; the method further comprises generating a power on signal, and controlling the backlight module in a power on state upon receiving the power on signal.

Optionally, the method further comprises controlling an application processor of the display apparatus in a state in which transmission of analog voltage from the application processor to a display panel of the display apparatus is resumed when the power on signal is generated.

Optionally, the display apparatus is a mobile phone comprising a front cover, a back cover, two long sides parallel to each other connecting the front cover and the back cover, the method further comprising detecting a contact from a conductive object abutting against the back cover; generating a signal representing a gross contact area between the conductive object and the back cover; comparing the gross contact area with a threshold contact area; and generating the power off signal if the motion parameter is greater than the threshold value and the gross contact area is greater than the threshold contact area.

Optionally, the display apparatus is a mobile phone comprising a front cover, a back cover, two long sides parallel to each other connecting the front cover and the back cover, the method further comprising detecting a pressure from fingers pressed against the two long sides; generating a signal representing a value of the pressure; comparing the value of the pressure with a threshold pressure value; and generating the power off signal if the motion parameter is greater than the threshold value and the value of the pressure is no greater than the threshold pressure value.

Optionally, the display apparatus is a mobile phone comprising a front cover, a back cover, two long sides parallel to each other connecting the front cover and the back cover, the method further comprising detecting a contact from a conductive object abutting against the back cover; generating a signal representing a gross contact area between the conductive object and the back cover; detecting a pressure from fingers pressed against the two long sides; generating a signal representing a value of the pressure; comparing the gross contact area with a threshold contact area; comparing the value of the pressure with a threshold pressure value; and generating the power off signal if the motion parameter is greater than the threshold value, the gross contact area is greater than the threshold contact area, and the value of the pressure is no greater than the threshold pressure value.

Optionally, the controlling step further comprises turn off touch control function of the display apparatus upon receiving the power off signal.

In another aspect, the present disclosure provides a method for controlling power usage of a mobile phone comprising a display panel, a backlight module, a front cover, a back cover, two long sides parallel to each other connecting the front cover and the back cover, the method comprising detecting a contact from a conductive object abutting against the back cover; generating a signal representing a gross contact area between the conductive object and the back cover; comparing the gross contact area with a threshold contact area; and generating a power off signal if the gross contact area is greater than the threshold contact area; and controlling a state of the backlight module of the mobile phone based on an outcome of the comparing step; wherein the controlling step comprises controlling the backlight module in a power off state when the power off signal is generated.

Optionally, the method further comprises detecting a motion parameter of the display apparatus; generating a motion parameter signal representing a motion parameter; the motion parameter comprises a vibration frequency and an acceleration; and comparing the motion parameter with a threshold value; and generating the power off signal if the motion parameter is greater than the threshold value and the gross contact area is greater than the threshold contact area.

Optionally, the method further comprises detecting a pressure from fingers pressed against the two long sides; generating a signal representing a value of the pressure; and comparing the value of the pressure with a threshold pressure value; and generating the power off signal if the gross contact area is greater than the threshold contact area, and the value of the pressure is no greater than the threshold pressure value.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now describe more specifically with reference to the following embodiments. It is to be noted that the following descriptions of some embodiments are presented herein for purpose of illustration and description only. It is not intended to be exhaustive or to be limited to the precise form disclosed.

Figure 1:
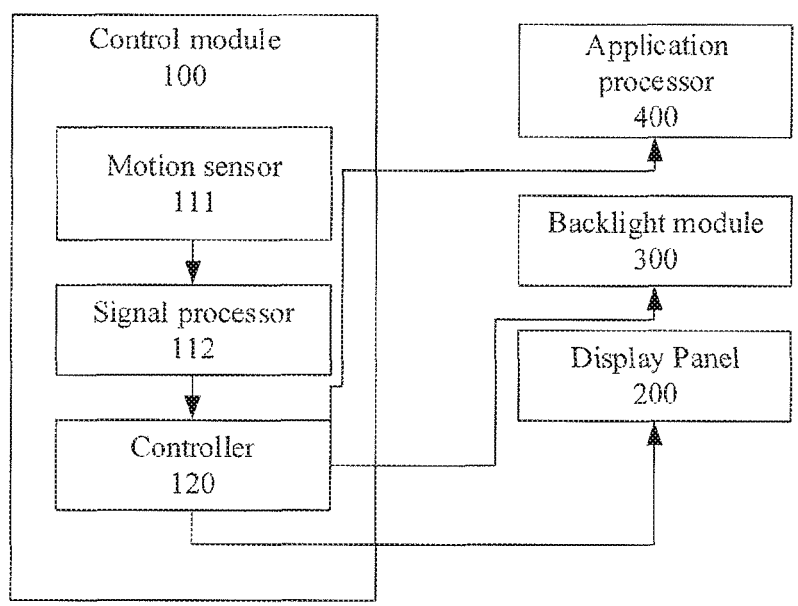
FIG. 1 is a diagram illustrating a display apparatus in some embodiments.

In one aspect, the present disclosure provides a novel display apparatus. FIG. 1 is a diagram illustrating a display apparatus in some embodiments. Referring to FIG. 1, the display apparatus in the embodiment includes a display panel 200, a backlight module 300, and a control module 100. In some embodiments, the control module 100 includes a motion sensor 111, a signal processor 112, and a controller 120. The motion sensor 111 in the embodiment is configured to detect a motion parameter of the display apparatus and generate a motion parameter signal representing a motion parameter. The signal processor 112 in the embodiment is configured to compare the motion parameter with a threshold value and generate a power off signal if the motion parameter is greater than the threshold value. The controller 120 in the embodiment is configured to control the backlight module 300 in a power off state upon receiving the power off signal. In some embodiments, the motion parameter includes a vibration frequency and an acceleration. Accordingly, the motion parameter includes a value of vibration frequency and a value of acceleration.

The present display apparatus uses the motion parameter of the display apparatus as an indicator for determining whether a user is still viewing a display on the display apparatus. When the motion parameter is greater than the threshold value, the display apparatus determines that the user is not viewing the display. When it is determined that the user is not viewing the display, the backlight module 300 is turned off to reduce power consumption and increase operational time of the display apparatus. Because a use condition of the display apparatus is determined based on the motion parameter instead of a presence or absence of user operation, the user may continue viewing the display for a prolonged period of time without interruption.

As used herein, the term "motion parameter" refers to a parameter for detecting a motion, e.g., a vibrational motion, an accelerational motion, or in particular, a combination thereof; by means of a change in travel distance, a change in speed, a change in acceleration, or in particular, any combination thereof. Optionally, the motion sensor includes an accelerometer, for example, a single axial accelerometer (e.g., a Z-axis accelerometer) or a triple axial accelerometer. Optionally, the vibration sensor further includes a gyroscope. Optionally, the vibration sensor includes an inertial sensor.

In some embodiments, the display apparatus further includes an application processor 400 for transmitting analog voltage to the display panel 200. Optionally, the controller 120 is configured to control the application processor 400 in a state in which transmission of analog voltage to the display panel 200 is discontinued upon receiving the power off signal. For example, if the motion parameter is greater than the threshold value, the controller 120 generates a first analog voltage control signal and transmits the first analog voltage control signal to the application processor 400. The first analog voltage control signal causes the application processor 400 to be in the state in which transmission of analog voltage from the application processor 400 to the display panel 200 is discontinued upon receiving the first analog voltage control signal.

The purpose of transmitting analog voltage to the display panel 200 is to provide electricity to a driving chip of the display apparatus. By stopping transmission of analog voltage from the application processor 400 to a display panel 200, power consumption can be further reduced and the operational time further increased.

In some embodiments, the controller 120 is configured to maintain the states of the backlight module 300 and the application processor 400 if the motion parameter is no greater than the threshold value and the display apparatus is in a sleep mode. For example, when the display panel is in a sleep mode, if the signal processor 112 determines that the motion parameter is no greater than the threshold value, the states of the backlight module 300 and the application processor 400 are maintained, e.g., the signal processor 112 does not generate a power on signal. In the absence of the power on signal, the controller 120 generates a signal for maintaining the state of the backlight module 300, and transmits the signal for maintaining the state (e.g., a power off state) of the backlight module 300 to the backlight module 300. Optionally, in the absence of the power on signal, the controller 120 generates a second analog voltage control signal for maintaining the state of the application processor 400, and transmits the second analog voltage control signal for maintaining the state (e.g., a state in which transmission of analog voltage is discontinued) of the application processor 400 to the application processor 400. The second analog voltage control signal causes the application processor 400 to maintain the analog voltage transmission state upon receiving the second analog voltage control signal.

As used herein, the term "sleep mode" refers to a power saving mode where a processor of a display apparatus is not completely turned off but is operated at a power level to retain its memory content so that it may wake up for normal operation from the point it went into sleep mode. To permit a processor which has been placed in sleep mode to promptly resume normal operations, the contents of internal data and address registers are saved. As used herein the term "active mode" refers to a mode where the processor of the display apparatus performs its normal operation, e.g., responding to input or performing certain scheduled activity. In the context of the present disclosure, when the processor of the display apparatus is in an active mode, the backlight module may be turned off. Similarly, when the processor of the display apparatus is in an active mode, the transmission of analog voltage to the display panel may be discontinued. Optionally, when the processor of the display apparatus is in an active mode, touch control of the display apparatus is turned off. Optionally, when the processor of the display apparatus is in an active mode, the backlight module is turned on, and the transmission of analog voltage to the display panel is maintained. Optionally, when the processor of the display apparatus is in a sleep mode, the backlight module is turned off, the transmission of analog voltage to the display panel is discontinued, and other functions such as touch control are also turned off.

In some embodiments, the display apparatus is in an active mode but the backlight module 300 is turned off, or the application processor 400 in the state in which transmission of analog voltage from the application processor 400 to the display panel 200 is discontinued, or both. Optionally, the controller 120 is configured to change one or both states of the backlight module 300 and the application processor 400 if the motion parameter is no greater than the threshold value and the display apparatus is in an active mode. For example, when the display panel is still in an active mode, if the signal processor 112 determines that the motion parameter is no greater than the threshold value, one or both states of the backlight module 300 and the application processor 400 may be changed, e.g., the signal processor 112 generates a power on signal. Upon receiving the power on signal from the signal processor 112, the controller 120 generates a signal for turning on the backlight module 300, and transmits the signal for turning on the backlight module 300 to the backlight module 300. Optionally, upon receiving the power on signal from the signal processor 112, the controller 120 generates a third analog voltage control signal and transmits the third analog voltage control signal to the application processor 400. The third analog voltage control signal causes the application processor 400 to be in the state in which transmission of analog voltage from the application processor 400 to the display panel 200 is resumed or continued upon receiving the third analog voltage control signal.

When the motion parameter (e.g., the vibration frequency and acceleration) was first detected, if the user is viewing a display of the display apparatus and the backlight module 300 is in a power on state, the backlight module 300 is maintained to be in the power on state in the present display apparatus. When the motion parameter (e.g., the vibration frequency and acceleration) was first detected, if the user sets the display apparatus on a sleep mode and the backlight module 300 is in a power off state, the backlight module 300 is maintained in a power off state in the present display apparatus. Because a use condition of the display apparatus is determined based on motion parameter instead of a presence or absence of user operation, the backlight module 300 will not automatically turn off solely based on an absence of user operation. The user may continue viewing the display for a prolonged period of time without interruption, e.g., without the backlight module 300 being turned off or being switched into a power saving state. A display apparatus in a sleep mode will not turn on the backlight module 300 simply because no motion (e.g., vibration and acceleration) is detected, power consumption can be reduced.

In some embodiments, the display apparatus further includes an application processor 400 for transmitting analog voltage to the display panel 200. Optionally, the controller 120 is configured to maintain an analog voltage transmission state of the application processor 400 if the motion parameter is no greater than the threshold value. Optionally, if the signal processor 112 determines that the motion parameter is no greater than the threshold value, no power off signal is generated by the signal processor 112. Optionally, in the absence of the power off signal from the signal processor 112, the controller 120 generates a signal for maintaining analog voltage transmission state of the application processor 400, and transmits the signal for maintaining analog voltage transmission state of the application processor 400 to the application processor 400.

Optionally, if the motion parameter is no greater than the threshold value, the controller 120 generates a second analog voltage control signal and transmits the second analog voltage control signal to the application processor 400. The second analog voltage control signal causes the application processor 400 to maintain the analog voltage transmission state upon receiving the second analog voltage control signal.

For example, if the motion parameter is determined to be no greater than the threshold value, and the application processor 400 was determined to in a state of transmitting analog voltage to the display panel 200 (e.g., the user is viewing a display) when the motion parameter was first detected, the application processor 400 is maintained in the state of transmitting analog voltage to the display panel 200. If the motion parameter is determined to be no greater than the threshold value, the application processor 400 was not transmitting analog voltage to the display panel 200, and the display apparatus is in a sleep mode when the motion parameter was first detected, the application processor 400 is maintained in the state of not transmitting analog voltage to the display panel 200.

As discussed above, if the motion parameter is determined to be greater than the threshold value, the backlight module 300 is turned off, and optionally, the transmission of analog voltage from the application processor 400 to the display panel 200 is discontinued. At this time, the display apparatus may be still in an active mode for a period of time before it goes into a sleep mode. According to the present disclosure, the backlight module 300 may be turned on and optionally the transmission of analog voltage from the application processor 400 to the display panel 200 may be resumed if the motion parameter is determined to be no greater than the threshold value, before the display apparatus goes into the sleep mode. Thus, power consumption may be further reduced in the present display apparatus by turning off backlight module 300 and transmission of analog voltage if it is determined that the user is not viewing the display.

In some embodiments, the display apparatus is a mobile phone or a small size tablet computer (e.g., a tablet that can fit in a palm of a user). The display apparatus includes a front cover, a back cover, two long sides parallel to each other connecting the front cover and the back cover. In some embodiments, the display apparatus includes a contact sensor on the back cover of the display apparatus (e.g., a mobile phone). The contact sensor is configured to detect a contact from a conductive object (e.g., a palm) abutting against the back cover, and generate a signal representing a gross contact area between the conductive object and the back cover. The signal processor is configured to compare the gross contact area with a threshold contact area, and generate a power off signal if the gross contact area is greater than the threshold contact area. Optionally, the signal processor is configured to compare the gross contact area with a threshold contact area, and generate the power off signal if the motion parameter is greater than the threshold value and the gross contact area is greater than the threshold contact area. The controller is configured to control the backlight module in a power off state upon receiving the power off signal.

When a user is using a small size display apparatus such as a mobile phone, typically the user's palm does not cover a large area of the back of the display apparatus. Typically, the user will hold the display apparatus using a few fingers. The contact area between the user's hand(s) and the display apparatus is relatively small when the display apparatus is in use. When the user is not using the display apparatus, the user may grab the display apparatus in her palm. The contact area between the user's palm and the display apparatus is relatively large. Accordingly, a use condition of the display apparatus may be determined based on the contact area with the back cover alone, i.e., the display apparatus uses contact area with the back cover as an indicator for determining whether a user is still viewing a display on the display apparatus. When the gross contact area is greater than the threshold contact area, the display apparatus determines that the user is not viewing the display. When it is determined that the user is not viewing the display, the backlight module is turned off to reduce power consumption and increase operational time of the display apparatus.

In some embodiments, a use condition of the display apparatus may be determined based on a combination of the motion parameter and the gross contact area with the back cover. The display apparatus uses the motion parameter and the gross contact area with the back cover as indicators for determining whether a user is still viewing a display on the display apparatus. When the motion parameter is greater than the threshold value and the gross contact area is greater than the threshold contact area, the display apparatus determines that the user is not viewing the display. When it is determined that the user is not viewing the display, the backlight module is turned off to reduce power consumption and increase operational time of the display apparatus.

In some embodiments, the display apparatus (e.g., a mobile phone) further includes one or more pressure sensor on the two long sides of the mobile phone. The pressure sensor is configured to detect a pressure from fingers pressed against the two long sides, and generate a signal representing a value of the pressure. The signal processor is configured to compare the value of the pressure with a threshold pressure value; and generate the power off signal if the value of the pressure is no greater than the threshold pressure value. Optionally, the signal processor is configured to compare the value of the pressure with a threshold pressure value; and generate the power off signal if the motion parameter is greater than the threshold value and the value of the pressure is no greater than the threshold pressure value. Optionally, the signal processor is configured to compare the value of the pressure with a threshold pressure value; and generate the power off signal if the motion parameter is greater than the threshold value, the gross contact area is greater than the threshold contact area, and the value of the pressure is no greater than the threshold pressure value. The controller is configured to control the backlight module in a power off state upon receiving the power off signal.

When the user is using a mobile phone (e.g., viewing a display on the mobile phone), typically the user's fingers will grab the two long sides of the mobile phone. The pressure against the two long sides of the mobile phone is relatively large when the mobile phone is in use. When the user is not using the mobile phone, the user will put it in her pocket or grab the mobile phone in her palm, the pressure against the two long sides of the mobile phone is relatively small. Accordingly, a use condition of the display apparatus may be determined based on the pressure alone or in combination with other indicators such as the motion parameter and the contact area with the back cover. Thus, the display apparatus may use the value of the pressure as one of the indicators for determining whether a user is still viewing a display on the mobile phone or otherwise using the mobile phone. When the value of the pressure is no greater than the threshold pressure value, the display apparatus determines that the user is not viewing the display. When it is determined that the user is not viewing the display, the backlight module is turned off to reduce power consumption and increase operational time of the display apparatus. Conversely, when the value of the pressure is greater than the threshold pressure value, the display apparatus determines that the user is using the mobile phone. When it is determined that the user is using the mobile phone, the backlight module is not turned off.

In some embodiments, a use condition of the display apparatus may be determined based on one or a combination of the motion parameter, the gross contact area with the back cover, and the value of pressure on the two long sides of the display apparatus. The display apparatus uses the motion parameter, the gross contact area with the back cover, and the value of pressure as indicators for determining whether a user is still viewing a display on the display apparatus. When the motion parameter is greater than the threshold value, the gross contact area is greater than the threshold contact area, and the value of the pressure is no greater than the threshold pressure value, the display apparatus determines that the user is not viewing the display. When it is determined that the user is not viewing the display, the backlight module is turned off to reduce power consumption and increase operational time of the display apparatus.

In some embodiments, the controller is configured to turn off touch control function of the display apparatus upon receiving the power off signal.

Optionally, the display panel 200 is a liquid crystal display panel.

Examples of display apparatuses include, but are not limited to, various portable apparatuses such as a mobile phone, a tablet computer, and a laptop computer.

In some embodiments, the display apparatus (e.g., a small size display apparatus, a mobile phone, or a small tablet computer) includes a display panel; a backlight module; a motion sensor for detecting a motion parameter of the display apparatus and generating a motion parameter signal representing a motion parameter; a front cover; a back cover; two long sides parallel to each other connecting the front cover and the back cover; a contact sensor on the back cover of the display apparatus for detecting a contact from a conductive object abutting against the back cover, and generating a signal representing a gross contact area between the conductive object and the back cover; and one or more pressure sensor on the two long sides of the display apparatus for detecting a pressure from fingers pressed against the two long sides, and generating a signal representing a value of the pressure. The display apparatus further includes at least one signal processor for comparing the motion parameter with a threshold value; comparing the gross contact area with a threshold contact area; comparing the value of the pressure with a threshold pressure value; and generating a power off signal if the motion parameter is greater than the threshold value, the gross contact area is greater than the threshold contact area, and the value of the pressure is no greater than the threshold pressure value. Optionally, the display apparatus further includes a controller for controlling a state of the backlight module; the controller is configured to control the backlight module in a power off state upon receiving the power off signal. Optionally, the display apparatus further includes an application processor for transmitting analog voltage to the display panel; wherein the controller is configured to control the application processor in a state in which transmission of analog voltage to the display panel is discontinued upon receiving the power off signal. Optionally, the controller is configured to transmit a first analog voltage control signal to the application processor upon receiving the power off signal, the application processor is configured to be in the state in which transmission of analog voltage to the display panel is discontinued upon receiving the first analog voltage control signal.

In some embodiments, the display apparatus (e.g., a small size display apparatus, a mobile phone, or a small tablet computer) includes a display panel; a backlight module; a front cover; a back cover; two long sides parallel to each other connecting the front cover and the back cover; a contact sensor on the back cover of the display apparatus for detecting a contact from a conductive object abutting against the back cover, and generating a signal representing a gross contact area between the conductive object and the back cover; and one or more pressure sensor on the two long sides of the display apparatus for detecting a pressure from fingers pressed against the two long sides, and generating a signal representing a value of the pressure. The display apparatus further includes at least one signal processor for comparing the gross contact area with a threshold contact area; comparing the value of the pressure with a threshold pressure value; and generating a power off signal if the gross contact area is greater than the threshold contact area, and the value of the pressure is no greater than the threshold pressure value. Optionally, the display apparatus further includes a controller for controlling a state of the backlight module; the controller is configured to control the backlight module in a power off state upon receiving the power off signal. Optionally, the display apparatus further includes an application processor for transmitting analog voltage to the display panel; wherein the controller is configured to control the application processor in a state in which transmission of analog voltage to the display panel is discontinued upon receiving the power off signal. Optionally, the controller is configured to transmit a first analog voltage control signal to the application processor upon receiving the power off signal, the application processor is configured to be in the state in which transmission of analog voltage to the display panel is discontinued upon receiving the first analog voltage control signal.

Figure 2:
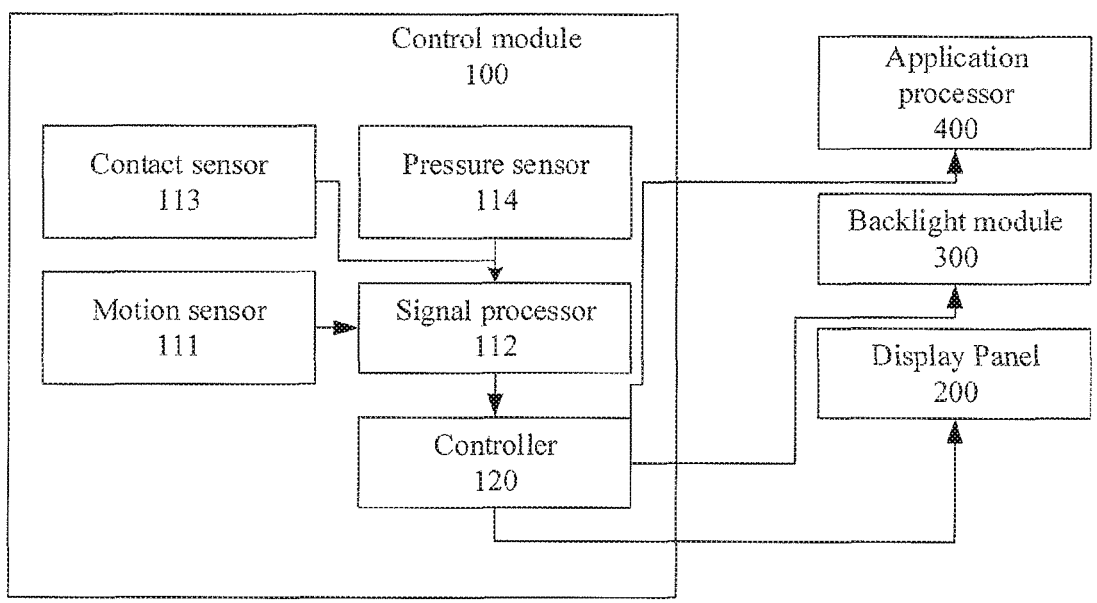
FIG. 2 is a diagram illustrating a display apparatus in some embodiments.

FIG. 2 is a diagram illustrating a display apparatus in some embodiments. Referring to FIG. 2, the display apparatus (e.g., a small size display apparatus, a mobile phone, or a small tablet computer) in the embodiment includes a display panel 200; a backlight module 300; a motion sensor 111 for detecting a motion parameter of the display apparatus and generating a motion parameter signal representing a motion parameter; a front cover; a back cover; two long sides parallel to each other connecting the front cover and the back cover; a contact sensor 113 on the back cover of the display apparatus for detecting a contact from a conductive object abutting against the back cover, and generating a signal representing a gross contact area between the conductive object and the back cover; and one or more pressure sensor 114 on the two long sides of the display apparatus for detecting a pressure from fingers pressed against the two long sides, and generating a signal representing a value of the pressure. The display apparatus further includes at least one signal processor 112 for comparing the motion parameter with a threshold value; comparing the gross contact area with a threshold contact area; comparing the value of the pressure with a threshold pressure value; and generating a power off signal if any of the following conditions is met: (1) the motion parameter is greater than the threshold value and the gross contact area is greater than the threshold contact area; (2) the motion parameter is greater than the threshold value and the value of the pressure is no greater than the threshold pressure value; (3) the gross contact area is greater than the threshold contact area and the value of the pressure is no greater than the threshold pressure value; and (4) the motion parameter is greater than the threshold value, the gross contact area is greater than the threshold contact area, and the value of the pressure is no greater than the threshold pressure value. Optionally, the display apparatus further includes a controller 120 for controlling a state of the backlight module 300; the controller 120 is configured to control the backlight module 300 in a power off state upon receiving the power off signal. Optionally, the display apparatus further includes an application processor 400 for transmitting analog voltage to the display panel; wherein the controller is configured to control the application processor 400 in a state in which transmission of analog voltage to the display panel 200 is discontinued upon receiving the power off signal. Optionally, the controller 120 is configured to transmit a first analog voltage control signal to the application processor 400 upon receiving the power off signal, the application processor 400 is configured to be in the state in which transmission of analog voltage to the display panel 200 is discontinued upon receiving the first analog voltage control signal.

In another aspect, the present disclosure provides a method for controlling power usage of a display apparatus. In some embodiments, the method includes detecting a motion parameter of the display apparatus; generating a motion parameter signal representing a motion parameter; comparing the motion parameter with a threshold value; and generating a power off signal if the motion parameter is greater than the threshold value; and controlling a state of a backlight module of the display apparatus based on an outcome of the comparing step. The controlling step includes controlling the backlight module in a power off state when the power off signal is generated. For example, if the backlight module was in a power on state when the motion parameter was first detected, and the motion parameter is determined to be greater than the threshold value, the controlling method includes turning off the backlight. If the backlight module was in a power off state when the motion parameter was first detected, and the motion parameter is determined to be greater than the threshold value, the controlling method includes keeping the backlight module in the power off state.

The backlight module may have various states. For example, the backlight module may have a power on state, a power off state, and a power saving state in which the backlight intensity is partially reduced.

When a user is viewing a display on the display apparatus, typically the user will keep the display apparatus as still as possible. When the user is not viewing a display on the display apparatus, typically the user will hold the display apparatus in her hands, in a pocket, or in a backpack. When the user moves, the display apparatus (e.g., a mobile phone) moves and shakes with the user. Thus, the motion parameter detected by the present method is a good indicator of the use condition of the display apparatus. For example, a motion parameter greater than a threshold value indicates that the user is not viewing the display on the display apparatus, and the display apparatus is moving and shaking with the user's movement. Accordingly, the present method controls the backlight module to be in a power off state to reduce power consumption. Operational time of the display apparatus can be increased by the present method.

The present method uses motion parameter of the display apparatus as an indicator for determining whether a user is still viewing a display on the display apparatus. When the motion parameter is greater than the threshold value, the method determines that the user is not viewing the display. When it is determined that the user is not viewing the display, the backlight module is turned off to reduce power consumption and increase operational time of the display apparatus. Because a use condition of the display apparatus is determined based on vibrational frequency instead of a presence or absence of user operation, the user may continue viewing the display for a prolonged period of time without interruption.

In some embodiments, the controlling step includes controlling an application processor of the display apparatus in a state in which transmission of analog voltage from the application processor to a display panel of the display apparatus is discontinued when the motion parameter is greater than the threshold value and the power off signal is generated. For example, if the motion parameter is greater than the threshold value, a first analog voltage control signal may be generated and transmitted to the application processor. The first analog voltage control signal causes the application processor to be in the state in which transmission of analog voltage from the application processor to the display panel is discontinued upon receiving the first analog voltage control signal.

For example, if the motion parameter is determined to be greater than the threshold value, and the application processor was determined to in a state of transmitting analog voltage to the display panel when the motion parameter was first detected, the controlling method includes stopping the transmission of analog voltage from the application processor to the display panel. If the motion parameter is determined to be greater than the threshold value, and the application processor was not transmitting analog voltage to the display panel when the motion parameter was first detected, the controlling method includes keeping the application processor in this analog voltage transmission state (i.e., not transmitting analog voltage to the display panel).

The purpose of transmitting analog voltage to the display panel is to provide electricity to a driving chip of the display apparatus. By stopping transmission of analog voltage from the application processor to a display panel, power consumption can be further reduced.

If the motion parameter is no greater than the threshold value, the controlling step includes maintaining the state of the backlight module. For example, if the backlight module is in a power saving state when the motion parameter was first detected, and if the motion parameter is no greater than the threshold value, the backlight module is maintained in a power saving state. If the backlight module is in a power on state when the motion parameter was first detected, and if the motion parameter is no greater than the threshold value, the backlight module is maintained in a power on state. Alternatively, if backlight module is in a power off state when the motion parameter was first detected, and if the motion parameter is no greater than the threshold value, the backlight module is maintained in a power off state.

Optionally, if the motion parameter is no greater than the threshold value, no power off signal is generated.

When the motion parameter was first detected, if the user is viewing a display of the display apparatus and the backlight module is in a power on state, the backlight module is maintained to be in the power on state according to the present method. When the motion parameter was first detected, if the user sets the display apparatus on a sleep mode and the backlight module is in a power off state, the backlight module is maintained in a power off state according to the present method. Because a use condition of the display apparatus is determined based on vibrational frequency instead of a presence or absence of user operation, the backlight module will not automatically turn off solely based on an absence of user operation. The user may continue viewing the display for a prolonged period of time without interruption, e.g., without the backlight module being turned off or being switched into a power saving state. A display apparatus in a sleep mode will not turn on the backlight module simply because no vibration is detected, power consumption can be reduced.

If the motion parameter is no greater than the threshold value, it indicates that either the user is viewing a display of the display apparatus or the display apparatus is not in motion, e.g., disposed on a desk. In some embodiments, the controlling step includes maintaining an analog voltage transmission state of an application processor of the display apparatus if the motion parameter is no greater than the threshold value. For example, if the motion parameter is no greater than the threshold value, a second analog voltage control signal may be generated and transmitted to the application processor. The second analog voltage control signal causes the application processor to maintain the analog voltage transmission state upon receiving the second analog voltage control signal.

For example, if the motion parameter is determined to be no greater than the threshold value, and the application processor was determined to in a state of transmitting analog voltage to the display panel (e.g., the user is viewing a display) when the motion parameter was first detected, the controlling method includes maintaining the application processor in the state of transmitting analog voltage to the display panel. If the motion parameter is determined to be no greater than the threshold value, and the application processor was not transmitting analog voltage to the display panel (e.g., the display apparatus is in a sleep mode) when the motion parameter was first detected, the controlling method includes maintain the application processor in the state of not transmitting analog voltage to the display panel.

Figure 3:
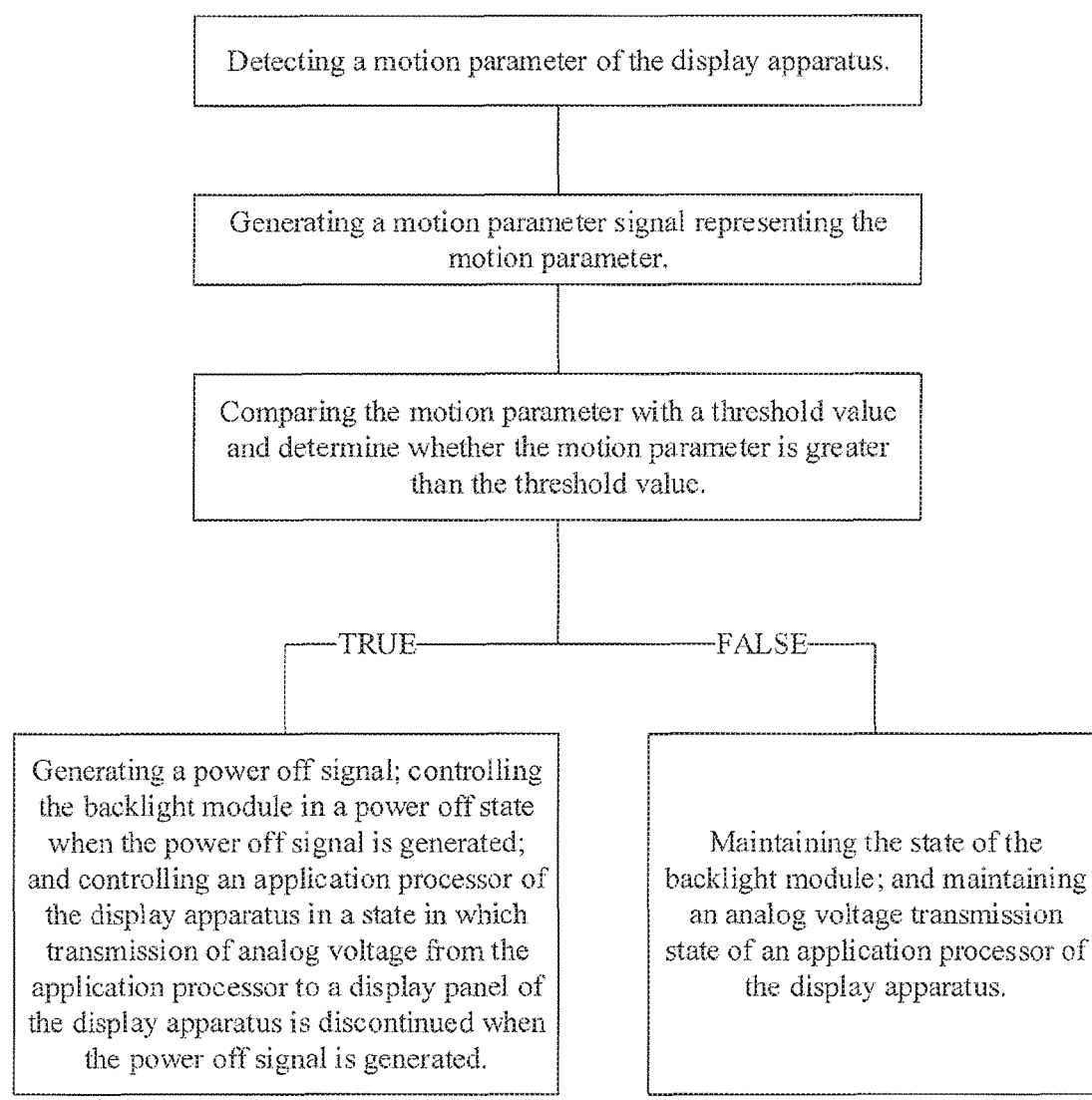
FIG. 3 is a flow chart illustrating a method for controlling power usage of a display apparatus in some embodiments.

FIG. 3 is a flow chart illustrating a method for controlling power usage of a display apparatus in some embodiments. Referring to FIG. 3, the method in the embodiment includes detecting a motion parameter of the display apparatus; generating a motion parameter signal representing a motion parameter; comparing the motion parameter with a threshold value and determine whether the motion parameter is greater than the threshold value. If the motion parameter is greater than the threshold value, the method includes generating a power off signal; controlling the backlight module in a power off state when the power off signal is generated; and controlling an application processor of the display apparatus in a state in which transmission of analog voltage from the application processor to a display panel of the display apparatus is discontinued when the power off signal is generated. If the motion parameter is no greater than the threshold value, the method includes maintaining the state of the backlight module; and maintaining an analog voltage transmission state of an application processor of the display apparatus. In some embodiments, the motion parameter includes a vibration frequency and an acceleration, the motion parameter includes a value of vibration frequency and a value of acceleration.

In some embodiments, the display apparatus is a mobile phone or a small size tablet computer (e.g., a tablet that can fit in a palm of a user). The display apparatus includes a front cover, a back cover, two long sides parallel to each other connecting the front cover and the back cover. In some embodiments, the method further includes detecting a contact from a conductive object (e.g., a palm) abutting against the back cover; generating a signal representing a gross contact area between the conductive object and the back cover; and comparing the gross contact area with a threshold contact area. Optionally, the method further includes generating the power off signal if the gross contact area is greater than the threshold contact area. Optionally, the method includes generating the power off signal if the motion parameter is greater than the threshold value and the gross contact area is greater than the threshold contact area. The controlling step includes controlling the backlight module in a power off state when the power off signal is generated.

When a user is using a small size display apparatus such as a mobile phone, typically the user's palm does not cover a large area of the back of the display apparatus. Typically, the user will hold the display apparatus using a few fingers. The contact area between the user's hand(s) and the display apparatus is relatively small when the display apparatus is in use. When the user is not using the display apparatus, the user may grab the display apparatus in her palm. The contact area between the user's palm and the display apparatus is relatively large. Accordingly, a use condition of the display apparatus may be determined based on the contact area with the back cover alone, i.e., the display apparatus uses contact area with the back cover as an indicator for determining whether a user is still viewing a display on the display apparatus. When the gross contact area is greater than the threshold contact area, the method determines that the user is not viewing the display. When it is determined that the user is not viewing the display, the backlight module is turned off to reduce power consumption and increase operational time of the display apparatus.

In some embodiments, a use condition of the display apparatus may be determined based on a combination of the motion parameter and the gross contact area with the back cover. The method uses the motion parameter and the gross contact area with the back cover as indicators for determining whether a user is still viewing a display on the display apparatus. When the motion parameter is greater than the threshold value and the gross contact area is greater than the threshold contact area, the method determines that the user is not viewing the display. When it is determined that the user is not viewing the display, the backlight module is turned off to reduce power consumption and increase operational time of the display apparatus.

In some embodiments, the method further includes detecting a pressure from fingers pressed against the two long sides; generating a signal representing a value of the pressure; and comparing the value of the pressure with a threshold pressure value. Optionally, the method further includes generating the power off signal if the value of pressure is no greater than the threshold pressure value. Optionally, the method includes generating the power off signal if the motion parameter is greater than the threshold value and the value of the pressure is no greater than the threshold pressure value. Optionally, the method includes generating the power off signal if the motion parameter is greater than the threshold value, the gross contact area is greater than the threshold contact area, and the value of the pressure is no greater than the threshold pressure value. The controlling step includes controlling the backlight module in a power off state when the power off signal is generated.

When the user is using a mobile phone (e.g., viewing a display on the mobile phone), typically the user's fingers will grab the two long sides of the mobile phone. The pressure against the two long sides of the mobile phone is relatively large when the mobile phone is in use. When the user is not using the mobile phone, the user will put it in her pocket or grab the mobile phone in her palm, the pressure against the two long sides of the mobile phone is relatively small. Accordingly, a use condition of the display apparatus may be determined based on the pressure alone or in combination with other indicators such as the motion parameter and the contact area with the back cover. Thus, the method may use the value of the pressure as one of the indicators for determining whether a user is still viewing a display on the mobile phone or otherwise using the mobile phone. When the value of the pressure is no greater than the threshold pressure value, the method determines that the user is not viewing the display. When it is determined that the user is not viewing the display, the backlight module is turned off to reduce power consumption and increase operational time of the display apparatus. Conversely, when the value of the pressure is greater than the threshold pressure value, the method determines that the user is using the mobile phone. When it is determined that the user is using the mobile phone, the backlight module is not turned off.

In some embodiments, a use condition of the display apparatus may be determined based on one or a combination of the motion parameter, the gross contact area with the back cover, and the value of pressure on the two long sides of the display apparatus. The method uses the motion parameter, the gross contact area with the back cover, and the value of pressure as indicators for determining whether a user is still viewing a display on the display apparatus. When the motion parameter is greater than the threshold value, the gross contact area is greater than the threshold contact area, and the value of the pressure is no greater than the threshold pressure value, the method determines that the user is not viewing the display. When it is determined that the user is not viewing the display, the backlight module is turned off to reduce power consumption and increase operational time of the display apparatus.

In some embodiments, the controlling step further comprises turn off touch control function of the display apparatus upon receiving the power off signal.

Figure 4:
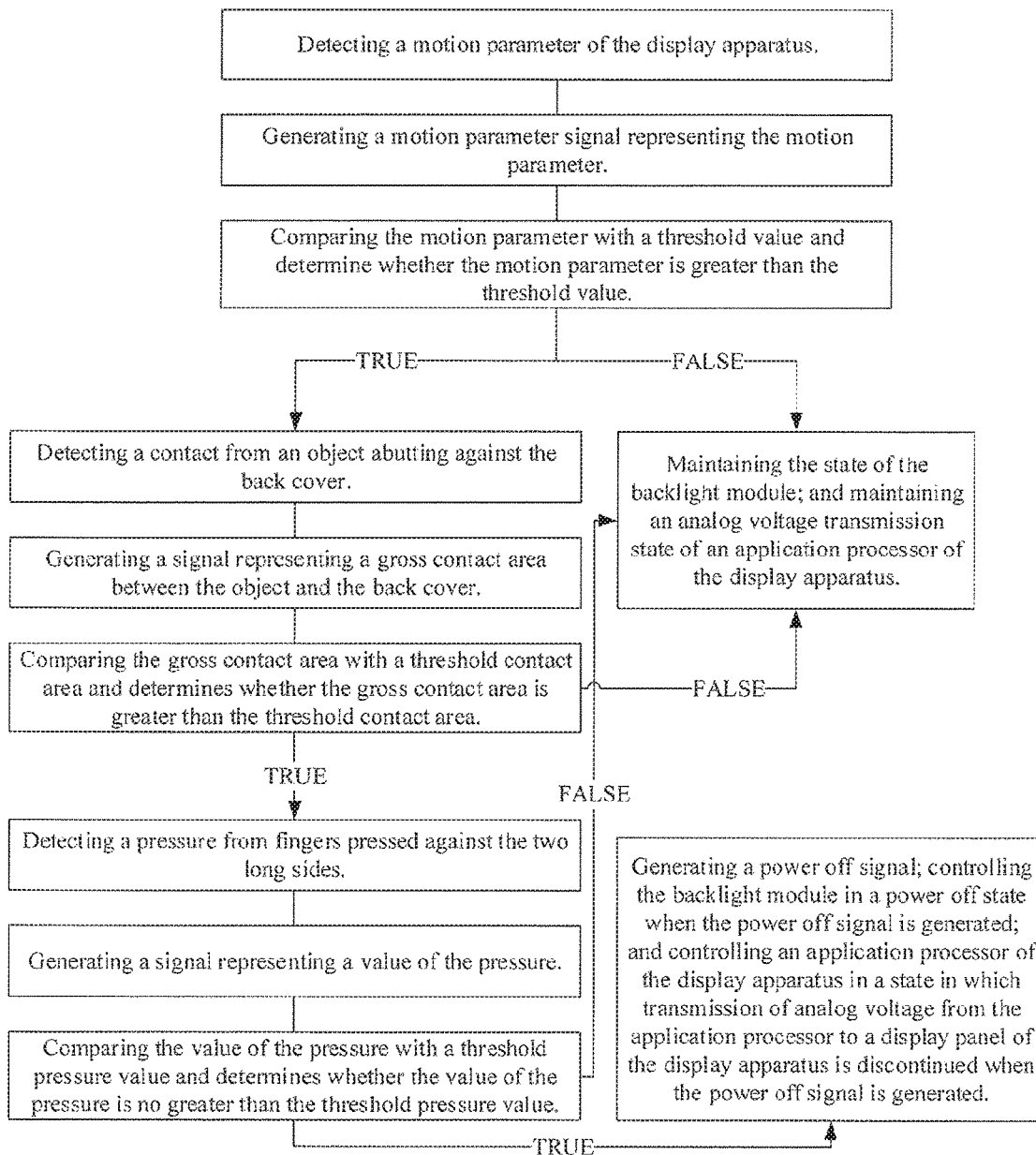
FIG. 4 is a flow chart illustrating a method for controlling power usage of a display apparatus in some embodiments.

FIG. 4 is a flow chart illustrating a method for controlling power usage of a display apparatus in some embodiments. Referring to FIG. 4, the method in the embodiment includes detecting a motion parameter of the display apparatus; generating a motion parameter signal representing a motion parameter; comparing the motion parameter with a threshold value and determine whether the motion parameter is greater than the threshold value. If the motion parameter is no greater than the threshold value, the method includes maintaining the state of the backlight module; and maintaining an analog voltage transmission state of an application processor of the display apparatus. If the motion parameter is greater than the threshold value, the method includes detecting a contact from a conductive object abutting against the back cover; generating a signal representing a gross contact area between the conductive object and the back cover; comparing the gross contact area with a threshold contact area and determines whether the gross contact area is greater than the threshold contact area. If the gross contact area is no greater than the threshold contact area, the method includes maintaining the state of the backlight module; and maintaining an analog voltage transmission state of an application processor of the display apparatus. If the gross contact area is greater than the threshold contact area, the method includes detecting a pressure from fingers pressed against the two long sides; generating a signal representing a value of the pressure; comparing the value of the pressure with a threshold pressure value and determines whether the value of the pressure is no greater than the threshold pressure value. If the value of the pressure is greater than the threshold pressure value, the method includes maintaining the state of the backlight module; and maintaining an analog voltage transmission state of an application processor of the display apparatus. If the value of the pressure is no greater than the threshold pressure value, the method further includes generating a power off signal; controlling the backlight module in a power off state when the power off signal is generated; and controlling an application processor of the display apparatus in a state in which transmission of analog voltage from the application processor to a display panel of the display apparatus is discontinued when the power off signal is generated. In some embodiments, the motion parameter includes a vibration frequency and an acceleration, the motion parameter includes a value of vibration frequency and a value of acceleration.

Figure 5:
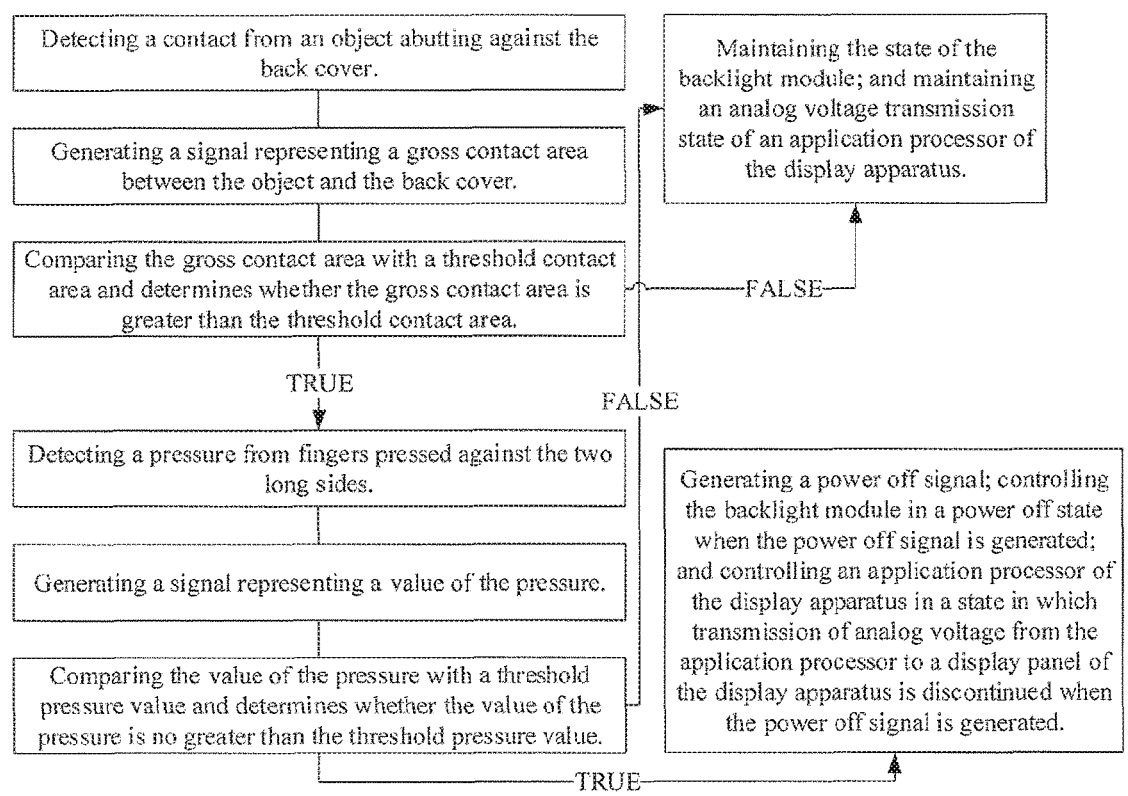
FIG. 5 is a flow chart illustrating a method for controlling power usage of a display apparatus in some embodiments.

FIG. 5 is a flow chart illustrating a method for controlling power usage of a display apparatus in some embodiments. Referring to FIG. 5, the method in the embodiment includes detecting a contact from a conductive object abutting against the back cover; generating a signal representing a gross contact area between the conductive object and the back cover, comparing the gross contact area with a threshold contact area and determines whether the gross contact area is greater than the threshold contact area. If the gross contact area is no greater than the threshold contact area, the method includes maintaining the state of the backlight module; and maintaining an analog voltage transmission state of an application processor of the display apparatus. If the gross contact area is greater than the threshold contact area, the method includes detecting a pressure from fingers pressed against the two long sides; generating a signal representing a value of the pressure; comparing the value of the pressure with a threshold pressure value and determines whether the value of the pressure is no greater than the threshold pressure value. If the value of the pressure is greater than the threshold pressure value, the method includes maintaining the state of the backlight module; and maintaining an analog voltage transmission state of an application processor of the display apparatus. If the value of the pressure is no greater than the threshold pressure value, the method further includes generating a power off signal; controlling the backlight module in a power off state when the power off signal is generated; and controlling an application processor of the display apparatus in a state in which transmission of analog voltage from the application processor to a display panel of the display apparatus is discontinued when the power off signal is generated.

Figure 6:
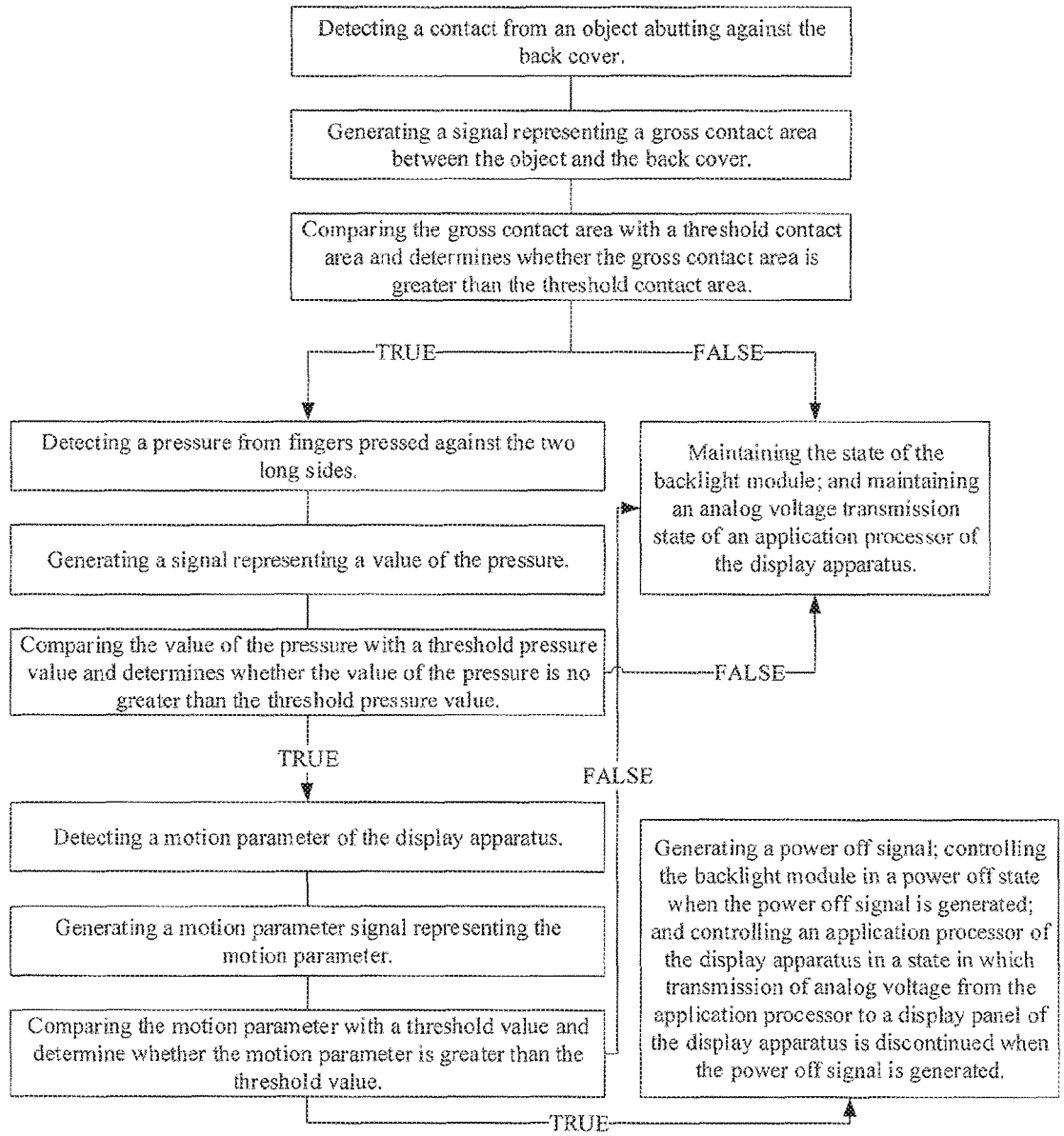
FIG. 6 is a flow chart illustrating a method for controlling power usage of a display apparatus in some embodiments.

FIG. 6 is a flow chart illustrating a method for controlling power usage of a display apparatus in some embodiments. Referring to FIG. 6, the method in the embodiment includes detecting a contact from a conductive object abutting against the back cover; generating a signal representing a gross contact area between the conductive object and the back cover; comparing the gross contact area with a threshold contact area and determines whether the gross contact area is greater than the threshold contact area. If the gross contact area is no greater than the threshold contact area, the method includes maintaining the state of the backlight module; and maintaining an analog voltage transmission state of an application processor of the display apparatus. If the gross contact area is greater than the threshold contact area, the method includes detecting a pressure from fingers pressed against the two long sides; generating a signal representing a value of the pressure; comparing the value of the pressure with a threshold pressure value and determines whether the value of the pressure is no greater than the threshold pressure value. If the value of the pressure is greater than the threshold pressure value, the method includes maintaining the state of the backlight module; and maintaining an analog voltage transmission state of an application processor of the display apparatus. If the value of the pressure is no greater than the threshold pressure value, the method further includes detecting a motion parameter of the display apparatus; generating a motion parameter signal representing a motion parameter; comparing the motion parameter with a threshold value and determine whether the motion parameter is greater than the threshold value. If the motion parameter is no greater than the threshold value, the method includes maintaining the state of the backlight module; and maintaining an analog voltage transmission state of an application processor of the display apparatus. If the motion parameter is greater than the threshold value, the method includes generating a power off signal; controlling the backlight module in a power off state when the power off signal is generated; and controlling an application processor of the display apparatus in a state in which transmission of analog voltage from the application processor to a display panel of the display apparatus is discontinued when the power off signal is generated. In some embodiments, the motion parameter includes a vibration frequency and an acceleration, the motion parameter includes a value of vibration frequency and a value of acceleration.

Figure 7:
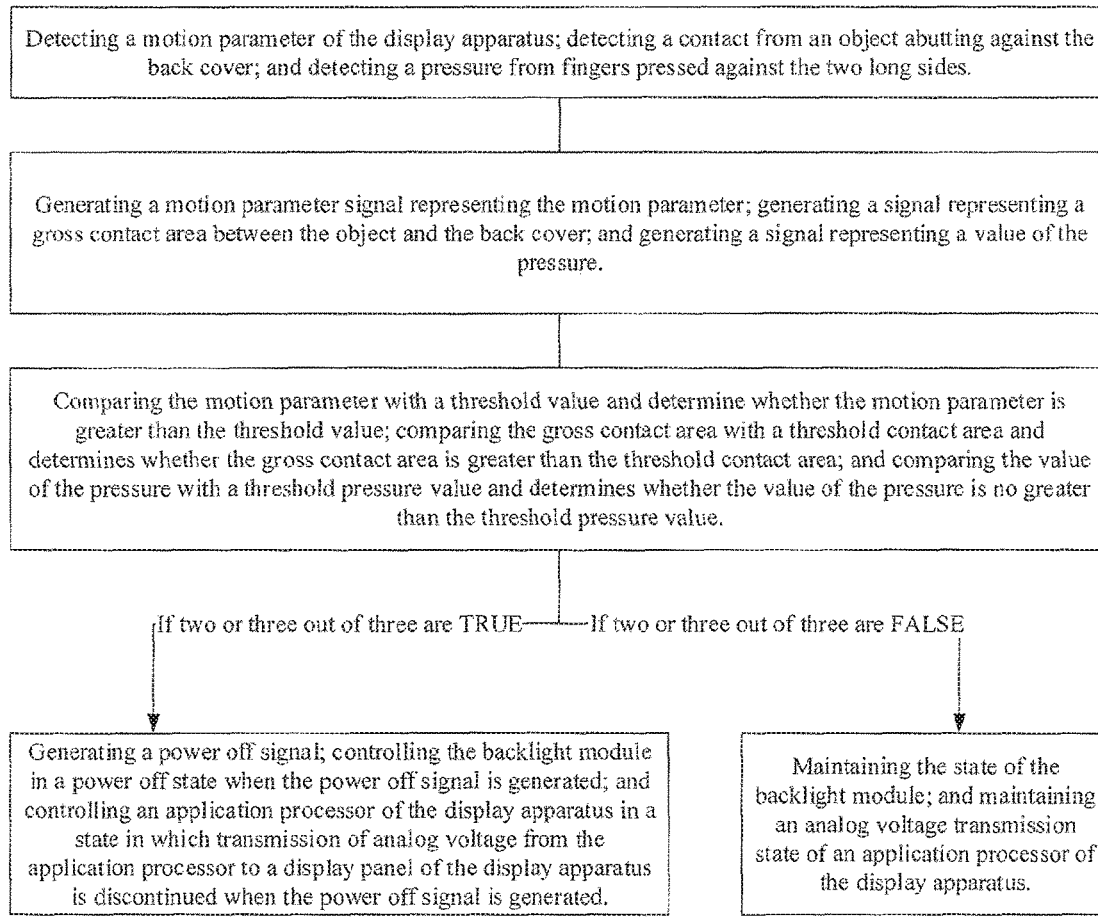
FIG. 7 is a flow chart illustrating a method for controlling power usage of a display apparatus in some embodiments.

FIG. 7 is a flow chart illustrating a method for controlling power usage of a display apparatus in some embodiments. Referring to FIG. 7, the method in the embodiment includes detecting a motion parameter of the display apparatus; detecting a contact from an object abutting against the back cover; and detecting a pressure from fingers pressed against the two long sides. The method further includes generating a motion parameter signal representing a motion parameter; generating a signal representing a gross contact area between the conductive object and the back cover; and generating a signal representing a value of the pressure. In some embodiments, the method further includes comparing the motion parameter with a threshold value and determine whether the motion parameter is greater than the threshold value; comparing the gross contact area with a threshold contact area and determines whether the gross contact area is greater than the threshold contact area; and comparing the value of the pressure with a threshold pressure value and determines whether the value of the pressure is no greater than the threshold pressure value. Based on the results of the comparison, the method may include different steps in controlling power usage. For example, if two or three out of three above comparisons are true, the method may include generating a power off signal; controlling the backlight module in a power off state when the power off signal is generated; and controlling an application processor of the display apparatus in a state in which transmission of analog voltage from the application processor to a display panel of the display apparatus is discontinued when the power off signal is generated. For example, the method includes generating a power off signal; controlling the backlight module in a power off state when the power off signal is generated; and controlling an application processor of the display apparatus in a state in which transmission of analog voltage from the application processor to a display panel of the display apparatus is discontinued when the power off signal is generated, if any of the following conditions is met: (1) the motion parameter is greater than the threshold value and the gross contact area is greater than the threshold contact area; (2) the motion parameter is greater than the threshold value and the value of the pressure is no greater than the threshold pressure value; (3) the gross contact area is greater than the threshold contact area and the value of the pressure is no greater than the threshold pressure value; and (4) the motion parameter is greater than the threshold value, the gross contact area is greater than the threshold contact area, and the value of the pressure is no greater than the threshold pressure value. In some embodiments, the motion parameter includes a vibration frequency and an acceleration, the motion parameter includes a value of vibration frequency and a value of acceleration.

Optionally, if two or three out of three comparisons are false, the method further includes maintaining the state of the backlight module; and maintaining an analog voltage transmission state of an application processor of the display apparatus. For example, the method includes maintaining the state of the backlight module; and maintaining an analog voltage transmission state of an application processor of the display apparatus, if any of the following conditions is met: (1) the motion parameter is no greater than the threshold value and the gross contact area is no greater than the threshold contact area; (2) the motion parameter is no greater than the threshold value and the value of the pressure is greater than the threshold pressure value; (3) the gross contact area is no greater than the threshold contact area and the value of the pressure is greater than the threshold pressure value; and (4) the motion parameter is no greater than the threshold value, the gross contact area is no greater than the threshold contact area, and the value of the pressure is greater than the threshold pressure value. In some embodiments, the motion parameter includes a vibration frequency and an acceleration, the motion parameter includes a value of vibration frequency and a value of acceleration.

In some embodiments, the display apparatus is a mobile phone or a small size tablet computer (e.g., a tablet that can fit in a palm of a user). The mobile phone or the small size tablet computer includes a display panel, a backlight module, a front cover, a back cover, two long sides parallel to each other connecting the front cover and the back cover. In another aspect, the present disclosure provides a method for controlling power usage of the mobile phone or the small size tablet computer including detecting a contact from a conductive object abutting against the back cover; generating a signal representing a gross contact area between the conductive object and the back cover; comparing the gross contact area with a threshold contact area; and generating a power off signal if the gross contact area is greater than the threshold contact area; and controlling a state of the backlight module of the mobile phone based on an outcome of the comparing step; wherein the controlling step comprises controlling the backlight module in a power off state when the power off signal is generated.

Similarly, other sensors such as the motion sensor and the pressure sensor described hereinthrough may also be utilized for controlling power usage of the mobile phone or the small size tablet computer.

In some embodiments, the method includes detecting a motion parameter of the display apparatus; generating a motion parameter signal representing a motion parameter; comparing the motion parameter with a threshold value; generating the power off signal if the motion parameter is greater than the threshold value; and controlling a state of the backlight module of the mobile phone based on an outcome of the comparing step; wherein the controlling step comprises controlling the backlight module in a power off state when the power off signal is generated.

In some embodiments, the method includes detecting a motion parameter of the display apparatus; generating a motion parameter signal representing a motion parameter; comparing the motion parameter with a threshold value; detecting a contact from a conductive object abutting against the back cover; generating a signal representing a gross contact area between the conductive object and the back cover; comparing the gross contact area with a threshold contact area; generating the power off signal if the motion parameter is greater than the threshold value and the gross contact area is greater than the threshold contact area; and controlling a state of the backlight module of the mobile phone based on an outcome of the comparing step; wherein the controlling step comprises controlling the backlight module in a power off state when the power off signal is generated. Optionally, the motion parameter includes a vibration frequency and an acceleration, the motion parameter includes a value of vibration frequency and a value of acceleration.

In some embodiments, the method further includes detecting a pressure from fingers pressed against the two long sides; generating a signal representing a value of the pressure; comparing the value of the pressure with a threshold pressure value; and generating the power off signal if the motion parameter is greater than the threshold value, the gross contact area is greater than the threshold contact area, and the value of the pressure is no greater than the threshold pressure value.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display apparatus having a front cover, a back cover, two long sides parallel to each other connecting the front cover and the back cover, comprising:
    a display panel;
    a backlight module;
    one or a combination of an accelerometer and a vibration sensor for detecting a motion parameter of the display apparatus and generating a motion parameter signal representing the motion parameter;
    at least one signal processor for comparing the motion parameter with a threshold value;
    a processor for controlling a state of the backlight module; and
    a contact sensor on the back cover of the display apparatus for detecting a contact from a palm abutting against the back cover and generating a signal representing a gross contact area between the palm and the back cover;
    wherein the at least one signal processor is configured to compare the gross contact area with a threshold contact area and generate a power off signal if the motion parameter is greater than the threshold value and the gross contact area is greater than the threshold contact area; and
    the processor is configured to control the backlight module in a power off state upon receiving the power off signal.

2. The display apparatus of claim 1, wherein the motion parameter comprises a vibration frequency and an acceleration.

3. The display apparatus of claim 1, further comprising an application processor for transmitting analog voltage to the display panel; wherein the processor is configured to control the application processor in a state in which transmission of analog voltage to the display panel is discontinued upon receiving the power off signal.

4. The display apparatus of claim 3, wherein the processor is configured to transmit an analog voltage control signal to the application processor upon receiving the power off signal, the application processor is configured to be in the state in which transmission of analog voltage to the display panel is discontinued upon receiving the analog voltage control signal.

5. The display apparatus of claim 1, wherein the processor is configured to maintain the state of the backlight module if the motion parameter is no greater than the threshold value and the display apparatus is in a sleep mode.

6. The display apparatus of claim 5, further comprising an application processor for sending analog voltage to the display panel; wherein the processor is configured to maintain an analog voltage transmission state of the application processor if the motion parameter is no greater than the threshold value.

7. The display apparatus of claim 6, wherein the processor is configured to transmit an analog voltage control signal to the application processor if the motion parameter is no greater than threshold value, the application processor is configured to maintain the analog voltage transmission state upon receiving the analog voltage control signal.

8. The display apparatus of claim 1, wherein
    the at least one signal processor is configured to generate a power on signal if the display apparatus is in an active mode while the backlight module is in a power off state and the motion parameter is equal to or less than the threshold value; and
    the processor is configured to control the backlight module in a power on state upon receiving the power on signal.

9. The display apparatus of claim 8, further comprising an application processor for sending analog voltage to the display panel; wherein the processor is configured to transmit an analog voltage control signal to the application processor if the motion parameter is no greater than threshold value, the application processor is configured to be in the state in which transmission of analog voltage to the display panel is resumed upon receiving the analog voltage control signal.

10. The display apparatus of claim 1, wherein the display apparatus is a mobile phone.

11. The display apparatus of claim 1, wherein the display apparatus is a mobile phone;
    the display apparatus further comprises one or more pressure sensor on the two long sides of the mobile phone for detecting a pressure from fingers pressed against the two long sides and generating a signal representing a value of the pressure; and
    the at least one signal processor is configured to compare the value of the pressure with a threshold pressure value and generate the power off signal if the motion parameter is greater than the threshold value and the value of the pressure is no greater than the threshold pressure value.

12. A mobile phone comprising a display panel, a backlight module, a front cover, a back cover, two long sides parallel to each other connecting the front cover and the back cover;

a contact sensor on the back cover of the mobile phone for detecting a contact from a palm abutting against the back cover and generating a signal representing a gross contact area between the palm and the back cover;

one or a combination of an accelerometer and a vibration sensor for detecting a motion parameter of the mobile phone and generating a motion parameter signal representing a motion parameter; the motion parameter comprises a vibration frequency and an acceleration;

at least one signal processor for comparing the motion parameter with a threshold value and comprising the gross contact area with a threshold contact area; and generating a power off signal if the motion parameter is greater than the threshold value and the gross contact area is greater than the threshold contact area; and a processor for controlling a state of the backlight module; the processor is configured to control the backlight module in a power off state upon receiving the power off signal.

13. The mobile phone of claim 12, further comprising one or more pressure sensor on the two long sides of the mobile phone for detecting a pressure from fingers pressed against the two long sides and generating a signal representing a value of the pressure;

wherein the at least one signal processor is configured to compare the value of the pressure with a threshold pressure value; and generate the power off signal if the gross contact area is greater than the threshold contact area, and the value of the pressure is no greater than the threshold pressure value.

14. A method for controlling power usage of a display apparatus having a front cover, a back cover, two long sides parallel to each other connecting the front cover and the back cover, comprising:

detecting a motion parameter of the display apparatus;
generating a motion parameter signal representing a motion parameter;
comparing the motion parameter with a threshold value;
detecting a contact from a palm abutting against the back cover; generating a signal representing a gross contact area between the palm and the back cover;
comparing the gross contact area with a threshold contact area;
generating a power off signal if the motion parameter is greater than the threshold value and the gross contact area is greater than the threshold contact area; and controlling a state of a backlight module of the display apparatus;

wherein controlling the state of the backlight module comprises controlling the backlight module in a power off state when the power off signal is generated.

15. The method of claim 14, wherein the motion parameter comprises a vibration frequency and an acceleration.

16. The method of claim 14, wherein controlling the state of the backlight module further comprises controlling an application processor of the display apparatus in a state in which transmission of analog voltage from the application processor to a display panel of the display apparatus is discontinued when the power off signal is generated.

17. The method of claim 16, wherein controlling the state of the backlight module further comprises transmitting an analog voltage control signal to the application processor when the power off signal is generated, causing the application processor to be in the state in which transmission of analog voltage from the application processor to the display panel is discontinued upon receiving the analog voltage control signal.

18. The method of claim 14, wherein controlling the state of the backlight module further comprises maintaining the state of the backlight module if the motion parameter is no greater than the threshold value and the display apparatus is in a sleep mode; and maintaining an analog voltage transmission state of an application processor of the display apparatus if the motion parameter is no greater than the threshold value.

19. The method of claim 14, wherein if the motion parameter is no greater than the threshold value; and the backlight module is in a power off state, the display apparatus is in an active mode when the motion parameter is determined to be no greater than the threshold value;

the method further comprising:

generating a power on signal, and controlling the backlight module in a power on state upon receiving the power on signal; and controlling an application processor of the display apparatus in a state in which transmission of analog voltage from the application processor to a display panel of the display apparatus is resumed when the power on signal is generated.

* * * * *